Patented July 1, 1947

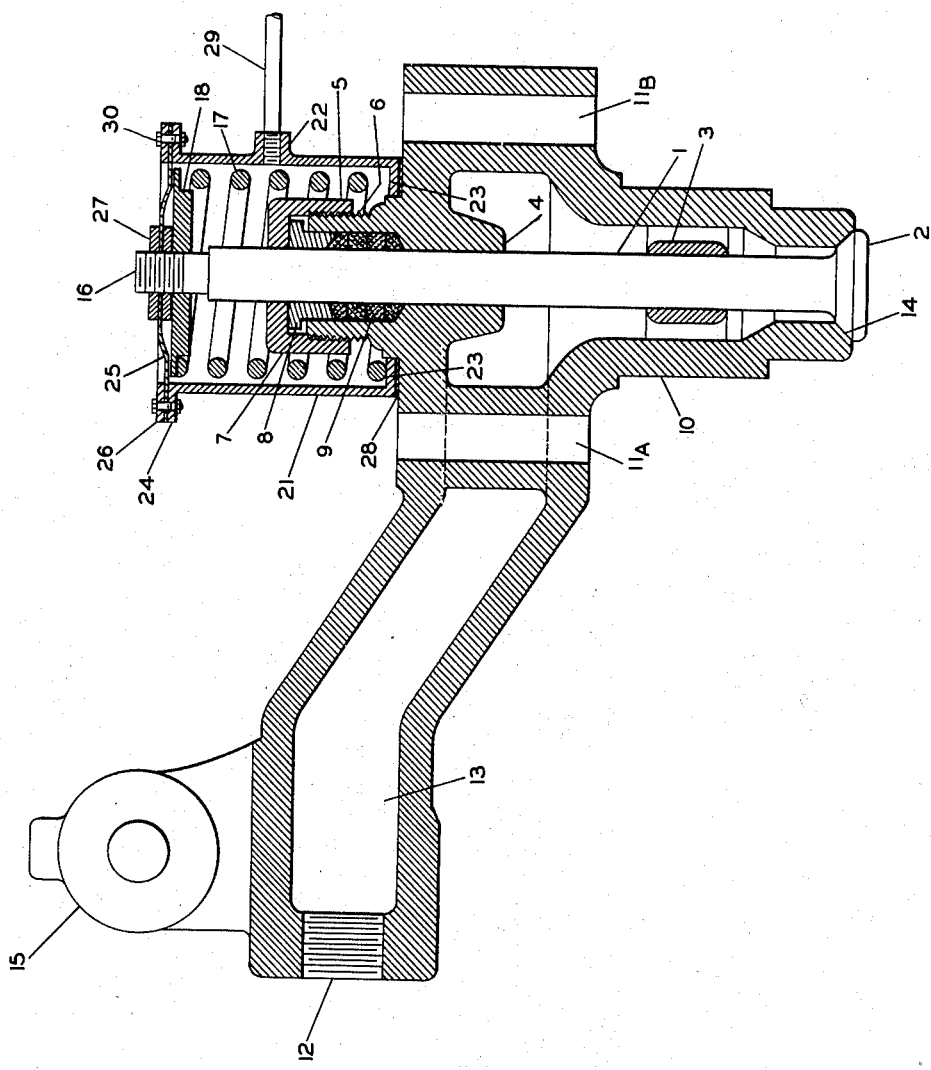

2,423,181

UNITED STATES PATENT OFFICE 2,423,181

GAS ENGINE SAFETY CAP

Melvin R. Emery, Kansas City, Kans., assignor to Phillips Petroleum Company, a corporation of Delaware Application December 13, 1945, Serial No. 634,842

2 Claims. (Cl. 123—188)

This invention relates to gas engines. In one of its more specific aspects it relates to a safety cap device for use in conjunction with a gas engine fuel injector.

In the operation of gas engines, natural or other combustible gas is used as fuel. Such engines may operate to draw fuel into the cylinders by suction of the intake stroke. When gas engines are in heavy duty service, not enough gas can be drawn into a cylinder to do the required work on account of the relatively low thermal value of normally gaseous fuel. In such cases the fuel is ordinarily injected or pumped under pressure into the cylinders. The source of oxygen for combustion is usually atmospheric. Some gas engines are 2-cycle engines, and sufficient air remains after the scavaging operation to support combustion for the power stroke to follow. In this case, following the scavaging operation, when the piston rises on the compression stroke, an inlet fuel valve opens and the fuel is injected. Such injection is complete as the piston approaches the top of its stroke and prior to ignition.

When gaseous fuel is injected into the cylinders under pressures of the order of 15 to 20 pounds per square inch gauge, the fuel valves frequently leak gas in spite of design and construction precautions. One such valve will hereinafter be fully described.

Leakage around these valve stems, obviously, provides material for a fire or an explosion. In one type of gas engine widely used, the design is such that the pressured fuel inlet valve is situated rather close to a spark plug. Any sparking or short circuiting at the outer end of the spark plug may promote an explosion.

I have found that in the normal operation of such gas engines that small explosions and fires in the vicinity of the fuel injection valve are common. As far as the engines are concerned, these small fires or explosions do not ordinarily cause serious damage. However, when such engines drive compressors or pumps which transfer or compress combustible gases, as natural gas or petroleum refinery gas, or volatile liquids, such as propane, butane, or gasoline, any leakage in the vicinity of the ignition end of the gas engine provides a potential hazard and explosions of serious consequence may occur.

One object of my invention is to provide a safety device to assist in preventing explosions caused by valve stem leakage.

Another object of my invention is to provide a safety device to assist in preventing explosions caused by leakage of combustible gas around valve stems of gas injection valves.

Other objects and advantages will be apparent to those skilled in the art from a study of the following disclosure when taken in conjunction with the accompanying drawing, which forms a part of this specification.

The figure is a diagrammatic cross sectional view of one embodiment of my safety cap device.

Referring now to the drawing, reference numeral 1 refers to a valve stem having a poppet type valve head 2, a valve guide 3, a further valve guide 4 and a stuffing box assembly 5. The stuffing box 5 is composed of the usual member parts, a threaded base member 6, a gland nut 7, a gland member 8 and some packing 9.

The valve guides 3 and 4, etc. are integral with a valve body 10, which, in ordinary construction, is usually a casting. Bolt holes 11a and 11b are provided for rigidly attaching the valve assembly to an engine head which, of course, has thread bolt holes to receive bolts. A channel 13 terminates at the exterior of the valve body at a threaded opening 12, which opening is for attachment to a source of fuel gas, not shown. The channel 13 extends from point 12 around bolt hole 11a, passes valve guide 3 and terminates in a valve seat 14 upon which the valve head 2 rests when the valve is in a "closed" position.

A rocker arm pivot member 15 is shown as cast integral with the valve body 10. The rocker arm, which pivots at pivot member 15 and extends to contact the valve stem at the end 16, is not shown for purposes of simplicity.

A compression spring 17, in conjunction with a spring retainer washer member 18, operates to hold the valve head 2 in a closed position excepting when the rocker arm (not shown), by pressure at point 16 opens the valve against said compression spring.

The valve assembly members mentioned hereinbefore are all known in the art and such members, and valve assembly, in one form or another are standard equipment for many gas engines on the market.

Even though the packing 9 is well lubricated and is compressed tightly by the action of the gland member 8 and gland nut 7, some leakage of combustible gaseous fuel occurs, and this leakage fuel when close to a spark plug, may result in small explosions and fires, as hereinbefore mentioned. This leakage is reasonable to expect at least to some extent since the fuel gas passes through the channel 13 from inlet point 12 toward the valve head 2 at pressures of the order of 20 pounds per square inch. Leakage is further to be expected due to rather rapid longitudinal motion of the valve stem when the engine is operating. Such engines frequently operate for long periods of time without interruption.

It is known that by tightening of such a packing gland leakage may be stopped but such packing tightening frequently causes excessive packing wear and may result in gas leakage. By the use of my invention such a valve may be operated without undue tightening of the packing, and in this manner one valve packing job may function for exceptionally long periods of time.

My invention for solving the problem at hand is a "safety cap" device which completely surrounds the spring and packing gland assembly so that combustible gas leaking through the packing cannot contact atmospheric oxygen and thereby constitute an explosive hazard.

My safety cap device is composed of a cylindrical shaped body member 21, having a side wall opening 22 threaded for taking a tube member 29. One end of this cylindrical body is turned "in" to provide an inner flange bearing surface for contact with the valve body, as indicated by reference numeral 23. The other end of the cylindrical body member 21 is turned "out" so as to provide an outer flange 24 for attachment of a diaphragm 25 and ring 26. This flange is drilled and the holes may or may not be threaded and takes bolts for fixing a diaphragm 25 and a ring 26 in position, as indicated.

The tappet end of the valve stem is threaded to take some diaphragm lock nuts 27. Other means may be used for attaching the diaphragm to the valve stem, however, providing a substantially gas-tight connection can be made. In some cases the thickness of the spring retainer washer 18 should preferably be reduced in order to make room at the threaded end of the valve stem for the thickness of the two diaphragm lock nuts 27 and the diaphragm 25. However, if the valve stem is sufficiently long, the retainer washer 18 may not need be reduced in thickness.

A gasket 28 provides a substantially gas tight seal so that combustible gas cannot leak out at this point.

The side wall opening 22 is threaded to take a small diameter tubing 29 to serve as a vent line to conduct gases from this safety cap to a point at which there is no danger of an explosion. I have, in one installation, run such a vent line out a window so that the combustible gas may be dissipated in the atmosphere.

As an example, I have used a $\frac{1}{16}$ inch thick diaphragm in a safety cap as herein disclosed, and have obtained long life of the diaphragm. In normal operation, such valves move only about $\frac{1}{8}$ to $\frac{3}{32}$ inch, and this small movement assists in promoting long diaphragm life.

The diaphragm may be made of any suitable material providing it is designed to withstand such movement as necessitated by opening and closing of the valve. Standard diaphragms, commercially available, may be used and have served well. Thus, especially designed and manufactured diaphragms are not required.

The cylindrical shaped body member, also, may be made of any material desired, such as brass or iron or steel. An advantage in the use of brass is that there is no opportunity for rusting. However, even with the use of an iron or steel member, there is little chance for rusting since such parts are usually oily from valve stem or other lubrication.

To install a safety cap device, it is merely necessary to remove the valve, thread the tappet end of the stem, place the valve back in its original position. Repack or otherwise adjust the packing gland assembly to permit free valve stem movement. Then position the cylindrical shaped body member 21 and gasket 28, insert the valve spring and spring retainer washer. One of the lock nuts is positioned on the threaded portion of the valve stem, the diaphragm 25 and the second of the lock nuts added. The second of the lock nuts is tightened sufficiently that there may be little or no gas leakage at this point. The diaphragm ring 26 is fastened in place by small bolts 30 sufficiently tight to make a tight connection. A vent tube is then inserted into the side connection 22 of the body member 21 and extended out a window or to other disposal as desired. With an adjustment of valve tappets and the rocker arm (not shown), the valve is then ready for operation.

It will be obvious to those skilled in the art that many variations and modifications of my safety cap may be made and yet remain within the intended spirit and scope of my invention.

Having disclosed my invention, I claim:

1. A device for preventing explosions in the vicinity of a fuel gas injector valve of a gas engine operating on fuel gas under superatmospheric pressure, said injector valve being a poppet valve having a valve head and a valve stem positioned within a valve body, the valve stem extending through a packing gland assembly in said valve body, and said valve head being held on a valve seat through action of a valve spring surrounding the tappet end of said valve stem, said packing gland assembly being subject to leakage of said superatmospheric fuel gas, comprising a cylindrical shaped, hollow body member having an inside flange on one end and an outside flange on the other end, said one end being placed in a substantially gas tight position against said valve body and the hollow body member surrounding said packing gland assembly and valve spring, the outside flange end of said body member fitted in a gas tight manner with a diaphragm, said valve stem extending through and being rigidly fixed to said diaphragm in a substantially gas tight manner; and a tube means connecting said hollow body member and a point remote from said valve forming gaseous communication between said hollow body member and said remote point.

2. A safety cap device adapted to be applied to gas engine poppet valves operating on fuel gas under superatmospheric pressure, the poppet valve stem extending through a packing gland assembly, a valve body wall and a helical valve spring in a conventional poppet valve manner, comprising a hollow cylindrical body member having an inner flange at one end and an outer flange at the other end and a side opening, said cylindrical body member being positioned around the tappet end of the valve stem in such a manner that the longitudinal axes of the body member and the valve stem substantially coincide, and with the inner flange end of said body member positioned in a substantially gas tight manner adjacent the valve body, a diaphragm in substantially gas tight relation with the outer flange end of said body member and said valve stem extending through said diaphragm and attached thereto in a substantially gas tight manner; and a tubular member connected with said side opening of the hollow cylindrical member and communicating with a remote point for venting leakage fuel gas from said cylindrical body member to said remote point.

MELVIN R. EMERY.

REFERENCES CITED

The following references are of record in the file of this patent:

UNITED STATES PATENTS

| Number | Name | Date |
|---|---|---|
| 306,314 | Beechey | Oct. 7, 1884 |
| 1,602,304 | Heldt | Oct. 5, 1926 |
| 1,682,499 | Gehres | Aug. 28, 1928 |
| 1,995,572 | Lower | Mar. 26, 1935 |
| 1,992,902 | McIntosh | Feb. 26, 1935 |
| 2,122,398 | Harrison | July 5, 1938 |